United States Patent
Matsushita et al.

(10) Patent No.: US 9,127,131 B2
(45) Date of Patent: Sep. 8, 2015

(54) POROUS SYNTHETIC RESIN MOLDED PART AND METHOD OF PRODUCING THE SAME

(75) Inventors: Ikuzo Matsushita, Nara (JP); Katsuya Takaichi, Nara (JP); Yoshiaki Nagata, Osaka (JP)

(73) Assignee: SHACHIHATA INC., Aichi (JP)

( * ) Notice: Subject to any disclaimer, the term of this patent is extended or adjusted under 35 U.S.C. 154(b) by 272 days.

(21) Appl. No.: 13/445,120

(22) Filed: Apr. 12, 2012

(65) Prior Publication Data

US 2012/0196945 A1 Aug. 2, 2012

Related U.S. Application Data

(63) Continuation-in-part of application No. 12/877,323, filed on Sep. 8, 2010, now abandoned.

(30) Foreign Application Priority Data

Feb. 19, 2010 (JP) ................................. 2010-035007

(51) Int. Cl.
*C08J 9/26* (2006.01)
*C08J 9/06* (2006.01)
(Continued)

(52) U.S. Cl.
CPC .............. *C08J 9/06* (2013.01); *B29C 43/003* (2013.01); *B29C 44/34* (2013.01); *B41K 1/50* (2013.01); *C08J 9/26* (2013.01); *C08J 9/283* (2013.01); *B29K 2105/0002* (2013.01);
(Continued)

(58) Field of Classification Search
IPC ........... C08J 2201/0444,2201/0446, 2201/0464, C08J 2303/08, 9/26
See application file for complete search history.

(56) References Cited

U.S. PATENT DOCUMENTS 3,755,517 A 8/1973 Clancy et al.
4,365,086 A * 12/1982 McKellin et al. ............. 562/512
(Continued)

FOREIGN PATENT DOCUMENTS

| JP | 2001-150780 | 6/2001 |
| JP | 2008007534 A * | 1/2008 |
| JP | 2008094981 A * | 4/2008 |
| WO | WO 2009152481 A1 * | 12/2009 |

OTHER PUBLICATIONS

Callais, P. "Organic Peroxides" in Coatings Technology Handbook, 3rd ed. Taylor and Francis, 2006. pp. 73-1 to 73-6.*

(Continued)

*Primary Examiner* — Randy Gulakowski
*Assistant Examiner* — Christina Wales
(74) *Attorney, Agent, or Firm* — Kubotera & Associates, LLC

(57) ABSTRACT

A method of producing a porous molded part includes a mixing process for mixing a granular porous organizer composed of a water-soluble compound, a porous forming assistant agent composed of a polyhydric alcohol, and a cross-linking agent composed of an organic peroxide with a thermoplastic resin composition having a glass transition temperature below 0° C. to obtain a molding material; a cross-linking and forming process for placing the molding material in a molding die and performing a heat press molding thereby progressing coincidentally a cross-linking reaction and a shape forming of a seal face to obtain a molded material; an extracting process for extracting the granular porous organizer from the molded material obtained in the cross-linking and forming process to obtain a porous molded part; and a drying process for drying the porous molded part obtained in the extracting process.

4 Claims, 1 Drawing Sheet

(51) Int. Cl.
  *B29C 43/00* (2006.01)
  *B41K 1/50* (2006.01)
  *C08J 9/28* (2006.01)
  *B29C 44/34* (2006.01)
  *B29K 105/00* (2006.01)
  *B29K 105/04* (2006.01)

(52) U.S. Cl.
  CPC ....... *B29K 2105/04* (2013.01); *C08J 2201/024* (2013.01); *C08J 2201/0464* (2013.01); *C08J 2323/06* (2013.01); *C08J 2323/08* (2013.01)

(56) References Cited

U.S. PATENT DOCUMENTS

| | | | |
|---|---|---|---|
| 5,140,053 | A | 8/1992 | Yamamoto et al. |
| 5,399,591 | A | 3/1995 | Smith et al. |
| 6,391,233 | B1 | 5/2002 | Otani et al. |
| 2011/0177320 | A1* | 7/2011 | Mehrabi et al. ............ 428/304.4 |

OTHER PUBLICATIONS

Table 1 from JP 2008-094981 by Nemoto.*

* cited by examiner

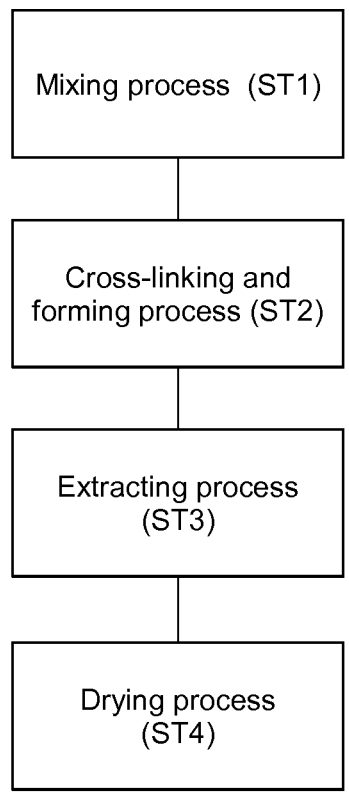

POROUS SYNTHETIC RESIN MOLDED PART AND METHOD OF PRODUCING THE SAME

CROSS-REFERENCE TO RELATED APPLICATIONS

This is a continuation-in-part application of a prior application Ser. No. 12/877,323, filed Sep. 8, 2010, now abandoned.

BACKGROUND OF THE INVENTION AND RELATED ART STATEMENT

The present invention relates to a porous synthetic resin molded part and a method of producing the porous synthetic resin molded part preferably used for a seal face of a self-inking stamp and the like.

Patent Reference has disclosed a conventional porous synthetic resin molded part. The porous synthetic resin molded part is formed of a thermoplastic resin or a thermosetting resin, and is used as a material of a face of a self-inking stamp. The porous synthetic resin molded part is formed of a porous body with a porosity of 40% to 95% and Durometer hardness of 50 or higher.

Patent Reference: Japanese Patent Publication No. 2001-150780

Patent Reference has disclosed that a thermoplastic resin as a base material may contain a cross-linking agent such as an organic peroxide, so that the thermoplastic resin can be cross-linked through irradiating ultraviolet rays or radioactive rays. After the thermoplastic resin is formed in a sheet material, the sheet material is engraved with a laser to form a seal face. Accordingly, it is necessary to perform an engraving process to form the seal face after producing the sheet material.

An object of the present invention is to provide a method of producing a porous synthetic resin molded part preferably used for a seal face of a self-inking stamp and the like without an engraving process.

SUMMARY OF THE INVENTION

In order to attain the object described above, according to the present invention, a method of producing a porous synthetic resin molded part includes the steps of mixing a granular porous organizer composed of a water-soluble compound, a porous forming assistant agent composed of a polyhydric alcohol, and a cross-linking agent composed of an organic peroxide into a thermoplastic resin composition as a base material to obtain a molding material; injecting the molding material into a molding die; and performing a direct pressure molding (referred to as a compressive molding, a compression molding, or a heat press molding) at 140° C. to 170° C. for 4 to 10 minutes for performing a cross-linking reaction and forming a seal face coincidentally to obtain a molded part.

According the present invention, the method of producing a porous synthetic resin molded part may further include an extracting step of immersing the molded part obtained in the step of performing the direct pressure molding into heated water at 70° C. to 100° C. for extracting the granular porous organizer to obtain the porous synthetic resin molded part.

In the present invention, the direct pressure molding allows the cross-linking reaction and the shape forming of a seal face to progress coincidentally. Therefore, a further engraving process becomes to be unnecessary, and it is enabled to provide a production method for porous synthetic resin molded part preferable to be used for a self-inking stamp face or the like.

BRIEF DESCRIPTION OF THE DRAWINGS

FIG. 1 is a process chart showing a method of producing a porous synthetic resin molded part according to an embodiment of the present invention.

DETAILED DESCRIPTION OF PREFERRED EMBODIMENTS

Embodiments of the present invention will be hereinafter described with reference to the drawing.

According to the present embodiment, as shown in FIG. 1, a method of producing a porous synthetic resin molded part includes: a mixing process ST1 for obtaining a molding material through mixing a granular porous organizer composed of a water-soluble compound, a porous forming assistant agent composed of a polyhydric alcohol, and a cross-linking agent composed of an organic peroxide into a thermoplastic resin composition as a base material; a cross-linking and forming process ST2 for obtaining a molded material through placing or injecting the molding material into a molding die and performing a direct pressure molding (compressive molding, compression molding, or heat press molding) at 140° C. to 170° C. for 4 to 10 minutes thereby progressing coincidentally a cross-linking reaction and a shape forming of a seal face; an extracting process ST3 for obtaining a porous molded part through extracting the granular porous organizer from the molded material obtained in the cross-linking and forming process; and a drying process ST4 for drying the porous molded part obtained in the extracting process.

In the present embodiment, the thermoplastic resin is a base material of a self-inking stamp face, and preferably has a process temperature of 110° C. or less. Examples of the thermoplastic resin include an ethylene-vinyl acetate copolymer (EVA), a thermoplastic elastomer (TPE), low-density polyethylene (LDPE), linear low-density polyethylene (LL-DPE), and the like. Among them, a preferred material is a metallocene plastomer, synthesized with a metallocene catalyst, i.e., an ethylene alpha-olefin copolymer which has a low melting point, high flexibility, and good physical properties.

In the present embodiment, the granular porous organizer performs as hydraulic cores for forming interconnecting cells of the self-inking stamp face, and is preferably a water-soluble compound in consideration of a solvent to be used in the extracting process ST3 for obtaining the porous molded part. Examples of the water-soluble compound include polyhydric alcohols such as pentaerythritol and polyethylene glycol; sugars such as glucose, fructose and maltose; and water-soluble salts such as potassium chloride, sodium chloride, sodium sulfate and potassium nitrate. The water-soluble compound may be used alone or a combination thereof.

Pentaerythritol used as the granular porous organizer contains 95% or more of monopentaerythritol and 47% or more of hydroxyl group, and has a melting point (a temperature of starting to melt) of 180° C. or more. A granularity of the granular porous organizer may be appropriately selected according to quality required for the self-inking stamp face and a purpose. It is preferred that a grain diameter of the granular porous organizer as a 10% diameter thereof is approximately in a range of 10 μm to 12 μm, so that the self-inking stamp face has a fine and uniform porosity.

In the present embodiment, the cross-linking agent is capable of cross-linking at least the thermoplastic resin to be used. The cross-linking agent capable of cross-linking a synthetic resin includes dialkylperoxides, peroxy ketals, hydroperoxides, peroxy esters, and the like. The cross-linking agent preferably has a high decomposition temperature, so that the cross-linking agent can be heated approximately to 100° C. in a process of kneading the molding material.

When the cross-linking agent has an excessively high resolution temperature, it takes a longer time for the cross-linking. On the other hand, when the cross-linking agent has an excessively low resolution temperature, the cross-linking agent starts to decompose during the process of kneading, thereby making it difficult to obtain a good molded material. Therefore, it is preferred that the maximum kneading temperature is 100° C. or more and the cross-linking agent has a standard cross-linking temperature approximately of 150° C. (140° C. to 170° C.). Accordingly, the cross-linking agent is preferably selected from peroxy ketals. It is noted that the cross-linking agent may generate odor from a decomposed substance thereof.

In the present embodiment, the assistant agent for extracting the porous organizer includes a polyhydric alcohol. More specifically, the assistant agent includes a combination of a dihydric alcohol and a trihydric alcohol.

The dihydric alcohol includes polyethylene glycols, preferably a polyethylene glycol having an average molecular weight of 1,000 or higher. Polyethylene glycol has an advantageous effect of functioning as an extracting assistant agent, and further functions as a dispersing agent in the process of kneading and dispersing pentaerythritol as the porous organizer into the thermoplastic synthetic resin.

The trihydric alcohol includes glycerin. Glycerin has an advantageous effect as the extracting assistant agent, and further effectively improves a tearing strength of the extracted material (the porous molded part). When only polyethylene glycol is used for extraction, the extracted material tends to have a low tearing strength or poor dimensional stability due to swelling. Therefore, glycerin is preferably used. When the combination of the dihydric alcohol and the trihydric alcohol is used in a good balance, it is possible to obtain the molded part with remarkable extractability, physicality and ink absorbability.

In the present embodiment, in addition to the thermoplastic resin, the cross-linking agent, the porous organizer, and the porous forming assistant agent, the molding material may contain a plasticizing agent, a surface activating agent, a pigment, a thermal stabilizer, a lubricant, an ultraviolet absorbing agent, an antistatic agent, a fire retarding material, or an antiaging agent. It is preferred that such an additive is added with 50 parts by weight or less with respect to 100 parts by weight of the thermoplastic synthetic resin.

A mixing ratio of components in the mixing and dispersing process ST1 is as follows. Firstly, a ratio of the porous organizer and the porous forming assistant agent to 100 parts by weight of the thermoplastic synthetic resin is in a range from 150 to 500 parts by weight. When mixing amounts of the porous organizer and the porous forming assistant agent increase, the number of pores in the porous molded part increases, thereby making it possible to obtain a soft molded part. On the contrary, when the mixing amounts of the porous organizer and the porous forming assistant agent decrease, the number of the pores in the porous molded part decreases, thereby making it possible to obtain a hard molded part. The mixing amounts of the porous organizer and the porous forming assistant agent may be adjusted depending on an intended purpose thereof, so that the number of the pores and the hardness can be set in accordance with the intended purpose.

A ratio of the cross-linking agent is preferably in a range from one to five parts by weight, more preferably in a range from one to two parts by weight, relative to 100 parts by weight of the thermoplastic synthetic resin.

In the mixing and dispersing process ST1 according to the present embodiment, the molding material is obtained through blending and mixing uniformly the thermoplastic resin composition, the granular porous organizer, the porous forming assistant agent, and the cross-linking agent, in addition to the additives if necessary. In the mixing and dispersing process ST1, an open roll mill, a heat/pressure kneader, an intensive mixer, a single spindle extruder, a double spindle extruder, an internal mixer, a co-kneader, or a continuous kneading machine with double spindle rotor may be arbitrarily used.

In the cross-linking and forming process ST2 according to the present embodiment, the molding material obtained in the mixing and dispersing process ST1 is filled in a molding die having a cavity corresponding to a shape of the self-inking stamp face. Then, a direct pressure molding (referred to as a compression molding or a heat press molding) is performed under a specific condition (described later), so that a cross-linking reaction and a shape forming of the seal face are performed coincidentally.

A temperature for the cross-linking reaction and the shape forming is in a range from 140° C. to 170° C. where the thermoplastic synthetic resin composition melts thereby to soften, the porous forming assistant agent melts or softens, and the cross-linking agent decomposes to produce a cross-linked substance. A time duration for the cross-linking and forming is in a range from four to 10 minutes with the inclusion of preheating, air evacuating and gas evacuating. If the temperature for the cross-linking and forming exceeds 180° C., the cross-linking reaction progresses fast. In this case, the cross-linking reaction excessively progresses in the preheating stage, thereby making it difficult to obtain a high-quality molded material. On the contrary, if the temperature for the cross-linking and forming is lower than 140° C., the cross-linking reaction may not sufficiently complete. In this case, it may be difficult to remove a portion of the molded material from the molding die, thereby making it difficult to obtain a high-quality molded material. If the time duration for the cross-linking and forming is shorter than four minutes, the cross-linking reaction may not complete, thereby making it difficult to obtain a high-quality molded material. On the other hand, if the time duration for the cross-linking and forming exceeds ten minutes, the productivity becomes lower, thereby increasing a cost of the product.

In the cross-linking and forming process, the molding die includes a metal molding die made of aluminum, iron or the like, or a synthetic resin molding die made of phenol resin, ebonite or the like. For example, a commercially available resin material (e.g. Fuji Torelief, a product of FUJIFILM Corporation, Rigilon, a product of Tokyo Ohka Kogyo Co., Ltd.) may be used for the synthetic resin molding die. When the metal molding die is made of copper or an alloy thereof such as brass, copper tends to inhibit the cross-linking reaction, so that the metal molding die may not be suitable. According to the present embodiment, the molding die is formed with a pattern in accordance with characters, figures or designs of the stamp face, thereby forming the stamp face. Accordingly, it is unnecessary to perform an additional engraving process.

In the cross-linking and forming process, a direct pressure molding machine includes a heat press machine to be usually used for cross-linking a rubber, and a pressing capability thereof may be approximately within a range from 10 to 50 tons. While it is enough to heat up to approximately 200° C., an accurate temperature control is required.

In the cross-linking and forming process, after pre-heating the molding die to be used to a molding temperature, the molding material in a pellet-form is uniformly filled in the molding die. Then, the molding material is molded to obtain the molded material under the pressing and heating condition for four to 10 minutes through pre-heating, pressing, air evacuating and gas evacuating in this order. The molded material is removed from the molding die after being cooled down to a range from 30° C. to 50° C. of a surface temperature thereof. The molding material contains the porous organizer and the porous forming assistant agent not cross-linked. Particularly, the porous forming assistant agent has a melting point within the range from 50° C. to 60° C. Therefore, it is enabled to stabilize a shape of the molded material by releasing the same from the molding die after cooling down below the melting point.

In the extracting process of the porous organizer ST3, the porous forming assistant agent, and a residue thereof are removed from the molded material obtained through the cross-linking and forming process using an extracting solvent. The extracting solvent to be used in the present process preferably includes water due to an easy post process and a lower cost. When the molded material is immersed into water as the extracting solvent, it is possible to extract the porous organizer and the porous forming assistant agent from the molded material.

According to the present embodiment, the molded material is cross-linked to have a good thermal stability. Therefore, even though extracting with water having a temperature in a range from a room temperature to 100° C., preferably from 70° C. to 100° C., the porosity of the molded material may not be damaged. The temperature of water is appropriately selected depending on a type of thermoplastic resin composing the base material. When the molded material is cross-linked, as opposed to a molded material having a same composition without being cross-linked, it is possible to extract in a several fold fast time duration due to the heating effect. Therefore, it is possible to shorten the time required for the extracting process, thereby making it possible to quickly deliver a product. When the molded material with a general composition for the self-inking stamp face has a thickness of approximately 3 mm, it is possible to extract 93% or more under a condition of 70° C.×3 hours, while the time depends on the thermoplastic resin composition, and the size and the thickness of the molded material.

In the drying process ST4, the extract (the molded material) may be dried through natural drying for a long time to complete. The drying time may be shortened to several hours using a warm air drier or a dehumidification drier. A drying temperature may be in a range from 20° C. to 100° C., preferably in a range from 50° C. to 60° C. for one to two hours. When the molded material has the thickness of approximately 3 mm, the drying process may be completed at 60° C. for two hours.

As described above, according to the production method of the present embodiment, the direct pressure molding of the molding material including the cross-linking agent allows the cross-linking reaction and the shape forming of the seal face to progress coincidentally. Therefore, a further engraving process is unnecessary. Moreover, the molded material is immersed into hot water nearly equal to boiling water in the extracting process of the porous organizer and the porous forming assistant agent. Therefore, it is enabled to shorten the extracting time.

Furthermore, the porous synthetic resin molded part obtained through the processes has the porosity depending on the amount of the porous organizer contained in the molding material, and becomes the body with uniform interconnecting cells. In addition, the thermoplastic resin component as the base material is cross-linked, so that physical characteristics such as heat resistance, abrasion resistance and tension strength are strengthened compared with those of the thermoplastic resin composition as a raw material. Accordingly, it is expected to use the porous synthetic resin molded part in an application requiring heat resistance and abrasion resistance.

An experiment for evaluating the porous synthetic resin molded part will be explained next.

First Embodiment

In the evaluation, a first example was prepared as follows. 200 parts by weight of fine powder pentaerythritol as the granular porous organizer, 25 parts by weight of powder type polyethylene glycol as the first assistant agent, 10 parts by weight of glycerin as the second assistant agent, 0.1 part by weight of red organic pigment, and 5 parts by weight of the cross-linking agent were added into 100 parts by weight of linear low-density polyethylene (LLDPE) having a glass transition temperature between −110° C. and −20° C., and were mixed for five minutes using a high speed super mixer, thereby obtaining a uniform mixture. The mixture was kneaded using a double spindle extruder, thereby obtaining a molding material.

Second Embodiment

In the evaluation, a second example was prepared as follows. 200 parts by weight of fine powder pentaerythritol, 25 parts by weight of powder type polyethylene glycol, 10 parts by weight of glycerin, 0.1 part by weight of red organic pigment, and 5 parts by weight of peroxy ketal as the cross-linking agent were added into 100 parts by weight of low-density polyethylene (LDPE) having a glass transition temperature between −120° C. and −20° C., and were mixed for five minutes using a high speed super mixer, thereby obtaining a uniform mixture. The mixture was kneaded using a double spindle extruder, thereby obtaining a molding material.

Third Embodiment

In the evaluation, a third example was prepared as follows. 200 parts by weight of fine powder pentaerythritol, 25 parts by weight of powder type polyethylene glycol, 10 parts by weight of glycerin, 0.1 part by weight of red organic pigment, and 5 parts by weight of peroxy ketal as the cross-linking agent were added into 100 parts by weight of an ethylene alpha-olefin copolymer metallocene plastomer having a glass transition temperature between −120° C. and 0° C., and were mixed for five minutes using a high speed super mixer, thereby obtaining a uniform mixture. The mixture was kneaded using a double spindle extruder, thereby obtaining a molding material.

First Comparative Example

In the evaluation, a first comparative example was prepared as follows. 200 parts by weight of fine powder pentaerythritol as the granular porous organizer, 25 parts by weight of powder type polyethylene glycol as the first assistant agent, 10 parts by weight of glycerin as the second assistant agent, and 0.1 part by weight of red organic pigment were added into 100 parts by weight of linear low-density polyethylene (LLDPE) having a glass transition temperature between −110° C. and −20° C., and were mixed for five minutes using a high speed super mixer, thereby obtaining a uniform mixture. It should be noted that the first comparative example did not contain the cross-linking agent. Other compositions of the first comparative example were the same as those in the first example. The mixture was kneaded using a double spindle extruder, thereby obtaining a molding material.

Second Comparative Example

In the evaluation, a second comparative example was prepared as follows. 200 parts by weight of fine powder pentaerythritol, 25 parts by weight of powder type polyethylene glycol, and 10 parts by weight of glycerin, 0.1 part by weight of red organic pigment were added into 100 parts by weight of low-density polyethylene (LDPE) having a glass transition temperature between −120° C. and −20° C., and were mixed for five minutes using a high speed super mixer, thereby obtaining a uniform mixture. It should be noted that the second comparative example did not contain the cross-linking agent. The mixture was kneaded using a double spindle extruder, thereby obtaining a molding material.

Third Comparative Example

In the evaluation, a third comparative example was prepared as follows. 200 parts by weight of fine powder pentaerythritol, 25 parts by weight of powder type polyethylene glycol, 10 parts by weight of glycerin, and 0.1 part by weight of red organic pigment were added into 100 parts by weight of an ethylene alpha-olefin copolymer metallocene plastomer having a glass transition temperature between −120° C. and 0° C., and were mixed for five minutes using a high speed super mixer, thereby obtaining a uniform mixture. It should be noted that the third comparative example did not contain the cross-linking agent. The mixture was kneaded using a double spindle extruder, thereby obtaining a molding material.

Fourth Comparative Example

In the evaluation, a first comparative example was prepared as follows. 45 parts by weight of cone powder as the granular porous organizer was added into 190 parts by weight of an acetal polyvinylformal-melamine resin having a glass transition temperature between 55° C. and 100° C., and were mixed for five minutes using a high speed super mixer, thereby obtaining a uniform mixture. It should be noted that the fourth comparative example did not contain the assistant agent and the cross-linking agent. The mixture was kneaded using a double spindle extruder, thereby obtaining a molding material.

Fifth Comparative Example

In the evaluation, a first comparative example was prepared as follows. 350 parts by weight of anhydrous sodium sulfate as the granular porous organizer was added into 100 parts by weight of poly methyl methacrylate (PMMA) having a glass transition temperature between 70° C. and 105° C., and were mixed for five minutes using a high speed super mixer, thereby obtaining a uniform mixture. It should be noted that the fifth comparative example did not contain the assistant agent and the cross-linking agent. The mixture was kneaded using a double spindle extruder, thereby obtaining a molding material.

Sixth Comparative Example

In the evaluation, a third comparative example was prepared as follows. 500 parts by weight of sodium chloride as the granular porous organizer, 40 part by weight of a styrene solution, and 1.0 part by weight of peroxyl benzoyl were added into 60 parts by weight of an unsaturated polyester resin having a glass transition temperature between 70° C. and 130° C., and were mixed for five minutes using a high speed super mixer, thereby obtaining a uniform mixture. It should be noted that the sixth comparative example did not contain the assistant agent. The mixture was kneaded using a double spindle extruder, thereby obtaining a molding material.

Molding

The molding material was cross-linked and formed (molded) using a direct pressure molding machine. The molding temperature was in the range from 140° C. to 170° C., and the time duration was five minutes. It is to be noted that the molding temperature and the molding time was set as an optimum condition in accordance with sizes of a character, a symbol and a design of a resin molding die. In general, a preferred temperature was in a lower region of the range from 145° C. to 155° C., in a case of a size mark character stamp with a larger character, symbol or design. The preferred temperature was in a higher region of the range from 155° C. to 165° C. in a case of a ball mark character stamp with a smaller character, symbol or design. The molded material was immersed into hot water at 70° C. for three minutes (the extracting process), and then dried for two hours using a warm air drier (the drying process).

Evaluation

In order to evaluate the heat resistance of the porous synthetic resin molded part, the porous molded material was cut in chips of self-inking stamp faces each with a thickness of 2.7 mm and an area of 30 mm square. The chips were immersed into boiling water for 5 minutes, 10 minutes, 20 minutes, and 30 minutes, respectively, before drying the chips.

In order to confirm the interconnecting cells and evaluate heat resistance thereof, a commercially available oil-based black pigment ink (available from Taiyotomah Co., Ltd.) was absorbed from a bottom surface of the chip, and a time duration was measured until an upper surface of the chip became entirely black. The number of test specimen was three. Results thereof are shown in Table 1.

The chips made from the first to third comparative examples were shrunk and became small after one to three minutes of the treatment in boiling water. In spite of trying to absorb the ink from the bottom surface of the chip, there was no ink infiltration toward the upper surface of the chip. From this result, it was considered that the interconnecting cells were destroyed. In the samples without immersing into boiling water (zero minute), the time duration was from 13 to 100 minutes. Results thereof are shown in Table 1.

From the results shown in Table 1, it was confirmed that there was no significant difference in the ink absorption time between the samples treated in boiling water (5, 10, 20, and 30 minutes) and the samples not treated in boiling water (zero minute). Accordingly, the interconnecting cells were certainly formed, and not destroyed after the heat treatment.

TABLE 1

| | Heat resistance Treatment time | | | | |
|---|---|---|---|---|---|
| | 0 min | 5 min | 10 min | 20 min | 30 min |
| Example 1 | 13-18 min | 15-18 min | 10-17 min | 10-16 min | 10-13 min |
| Example 2 | 16 min | 25 min | 35 min | 35 min | 35 min |
| Example 3 | 100 min | 110 min | 110 min | 110 min | 110 min |
| Comparative example 1 | 13-18 min | shrunk (3 min) | | | |
| Comparative example 2 | 16 min | shrunk (1 min) | | | |
| Comparative example 3 | 100 min | shrunk (3 min) | | | |

In order to evaluate sequential stampability, a ball mark stamp face was prepared using a resin molding die under the condition described above. After an oil-based black ink was sufficiently absorbed into the porous molded part thus obtained, the porous molded part sequentially stamped onto white papers without refilling the ink, and the number of the stamps was measured. Similarly, a size mark stamp face was prepared using a resin molding die under the condition described above. After an alcohol-based blue dye ink was sufficiently absorbed in the porous molded part, the porous molded part sequentially stamped onto polyethylene bags without refilling the ink, and the number of the stamps was measured.

In the examples No. 1 to No. 3 and the comparative examples No. 1 to No. 3, when the ball mark stamp face stamped 1,000 times onto copy papers of A4 size, stamped ink seemed to be slightly diluted but decipherable. When the size mark stamp face stamped 700 times onto polyethylene (PP) bags, stamped ink seemed to be slightly diluted but decipherable. However, in the comparative examples No. 4 to No. 6, the ball mark stamp face could stamped only five times onto copy papers of A4 size and polyethylene (PP) bags. Results thereof are shown in Table 2.

In order to evaluate organic solvent resistance of the porous synthetic resin molded part, the porous molded material was cut in chips of self-inking stamp faces each with a thickness of 2.7 mm and an area of 30 mm square to prepare samples. The chips were immersed into ethyl alcohol, isopropyl alcohol (IPA), n-hexane, and toluene at a room temperature for five hours, and then were removed from the solvents.

In order to confirm the interconnecting cells of the chips after being immersed into the organic solvents, an oil-based black ink was absorbed from a bottom surface of the chip, and a time duration was measured until an upper surface of the chip became entirely black. For comparison, the time duration was measured with respect to the chip not immersed into the organic solvent (without treatment).

As a result, it took nine minutes to absorb the ink in the chip not immersed into the organic solvent. Further, it took seven minutes to absorb the ink in the chip immersed in ethyl alcohol, six minutes to absorb the ink in the chip immersed in isopropyl alcohol, seven minutes to absorb the ink in the chip immersed in n-hexane, and 11 minutes to absorb the ink in the chip immersed in toluene. In addition, the chips immersed into n-hexane and toluene were swollen and enlarged, and returned to original sizes after removed from the organic solvents. The chips immersed into ethyl alcohol and isopropyl alcohol (IPA) exhibited no change in size. From the results, it was confirmed that the interconnecting cells were not destructed in the organic solvents. Results thereof are shown in Table 2.

In order to determine Durometer hardness of the porous synthetic resin molded part, the porous molded material was subject to the type-C Durometer and the type-O Durometer according to ASTM D-2240. Results thereof are shown in Table 2. As shown in Table 2, it is confirmed that the first to third examples exhibit the proper Durometer hardness.

TABLE 2

| | Sequential stampability | | Organic solvent resistance (min) | | | | Durometer hardness | |
|---|---|---|---|---|---|---|---|---|
| | A4 | PP | ethyl alcohol | IPA | n-hexane | toluene | type-C | type-O |
| Example No. 1 | 1000 | 700 | 7 | 6 | 7 | 11 | 30 | 75 |
| Example No. 2 | 1000 | 700 | 28 | 52 | 27 | 20 | 30 | 75 |
| Example No. 3 | 1000 | 700 | 180 | 87 | 180 | 11 | 10 | 45 |
| Compar. Example No. 1 | 1000 | 700 | 7 | 6 | 7 | 11 | 20 | 65 |
| Compar. Example No. 2 | 1000 | 700 | 28 | 52 | 27 | 20 | 20 | 65 |
| Compar. Example No. 3 | 1000 | 700 | 180 | 87 | 180 | 11 | 10 | 40 |
| Compar. Example No. 4 | 5 | 5 | | | | | 72 | 90 |
| Compar. Example No. 5 | 5 | 5 | | | | | 80 | 90 |
| Compar. Example No. 6 | 5 | 5 | | | | | 86 | 90 |

As shown in Table 2, in the examples No. 1 to No. 3, when the material having a low glass transition temperature (between −120° C. and 0° C.) is used as the thermoplastic resin composition, it is possible to obtain the excellent sequential stampability due to the low Durometer hardness. On the other hand, in the comparative examples No. 4 to No. 6, when the material having a high glass transition temperature such as PMMA and the unsaturated polyester resin, it is difficult to obtain the good Sequential stampability due to the high Durometer hardness.

As shown in Table 1 and Table 2, only the examples No. 1 to No. 3 exhibit the balanced properties such as the heat resistance, the sequential stampability, and the solvent resistance.

What is claimed is:

1. A porous synthetic resin molded part, comprising:
a granular porous organizer composed of pentaerythritol,
a first porous forming assistant agent composed of polyethylene glycol,
a second porous forming assistant agent composed of glycerin,
a cross-linking agent composed of an organic peroxide; and
a thermoplastic resin having a glass transition temperature below 0° C.,
wherein said granular porous organizer is contained at an amount double of that of the thermoplastic resin, and
said second porous forming assistant agent is contained at an amount one tenth of that of the thermoplastic resin.

2. The porous synthetic resin molded part according to claim 1, wherein said thermoplastic resin is composed of at least one of an ethylene-vinyl acetate copolymer, a thermoplastic elastomer, low-density polyethylene (LDPE), linear low-density polyethylene (LLDPE), and an ethylene alpha-olefin copolymer.

3. The porous synthetic resin molded part according to claim 1, wherein said thermoplastic resin is adjusted so that the porous synthetic resin molded part has Durometer hardness of type-O below 75 according to ASTM D-2240.

4. The porous synthetic resin molded part according to claim 1, wherein said cross-linking agent has a cross-linking temperature between 140° C. and 170° C.

* * * * *